US008401292B2

(12) United States Patent
Park et al.

(10) Patent No.: US 8,401,292 B2
(45) Date of Patent: Mar. 19, 2013

(54) IDENTIFYING HIGH SALIENCY REGIONS IN DIGITAL IMAGES

(75) Inventors: Minwoo Park, Pittsford, NY (US); Alexander C. Loui, Penfield, NY (US); Mrityunjay Kumar, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 153 days.

(21) Appl. No.: 13/094,217

(22) Filed: Apr. 26, 2011

(65) Prior Publication Data
US 2012/0275701 A1    Nov. 1, 2012

(51) Int. Cl.
*G06K 9/34* (2006.01)
(52) U.S. Cl. ...................................................... 382/173
(58) Field of Classification Search .......... 382/173–180, 382/103, 100, 164, 224, 190, 199, 162, 108, 382/168, 171
See application file for complete search history.

(56) References Cited

U.S. PATENT DOCUMENTS

| | | | |
|---|---|---|---|
| 6,282,317 B1 | 8/2001 | Luo et al. | |
| 7,123,745 B1 * | 10/2006 | Lee | 382/103 |
| 7,349,922 B2 * | 3/2008 | Brandt et al. | 1/1 |
| 7,609,847 B2 * | 10/2009 | Widdowson et al. | 382/100 |
| 7,940,985 B2 * | 5/2011 | Sun et al. | 382/173 |
| 2004/0013305 A1 * | 1/2004 | Brandt et al. | 382/224 |
| 2008/0304740 A1 | 12/2008 | Sun et al. | |
| 2012/0288189 A1 * | 11/2012 | Hu et al. | 382/164 |

OTHER PUBLICATIONS

Itti et al.,"Computational modeling of visual attention" Nature Reviews, vol. 2, pp. 194-203 (2001).
Itti et al.,"A Model of saliency-based visual attention for rapid scene analysis", IEEE Transactions on Pattern Analysis and Machine Intelligence, vol. 20, pp. 1254-1259 (1998).
Felzenszwalb et al., "Efficient graph-based image segmentation," International Journal of Computer Vision, vol. 59, pp. 167-181 (2004).
Hou et al., "Saliency detection: a spectral residual approach," IEEE Conference on Computer Vision and Pattern Recognition, pp. 1-8 (2007).
Achanta et al., "Frequency-tuned Salient Region Detection," IEEE Conference on Computer Vision and Pattern Recognition, pp. 1597-1604 (2009).
Donoser et al., "Saliency driven total variation segmentation," IEEE International Conference on Computer Vision, pp. 817-824 (2009).
Valenti et al., "Image saliency by isocentric curvedness and color," IEEE International Conference on Computer Vision, pp. 2185-2192 (2009).
Cormen et al., "Introduction to Algorithms", MIT Press and McGraw-Hill, $2^{nd}$ Edition, Chapter 21, pp. 498-509 (2001).

(Continued)

*Primary Examiner* — Ishrat I Sherali
(74) *Attorney, Agent, or Firm* — Kevin E. Spaulding (57) ABSTRACT

A method for identifying high saliency regions in a digital image, comprising: segmenting the digital image into a plurality of segmented regions; determining a saliency value for each segmented region, merging neighboring segmented regions that share a common boundary in response to determining that one or more specified merging criteria are satisfied; and designating one or more of the segmented regions to be high saliency regions. The determination of the saliency value for a segmented region includes: determining a surround region including a set of image pixels surrounding the segmented region; analyzing the image pixels in the segmented region to determine one or more segmented region attributes; analyzing the image pixels in the surround region to determine one or more corresponding surround region attributes; determining a region saliency value responsive to differences between the one or more segmented region attributes and the corresponding surround region attributes.

14 Claims, 8 Drawing Sheets

OTHER PUBLICATIONS

Dalal et al., "Histograms of oriented gradients for human detection," IEEE Conference on Computer Vision and Pattern Recognition, pp. 886-893 (2005).

Albuz et al., "Scalable Color image indexing and retrieval using vector wavelets," IEEE Transactions on Knowledge and Data Engineering, vol. 13, pp. 851-861 (2001).

Qiu, "Color image indexing using BTC," IEEE Transaction on Image Processing, vol. 12, pp. 93-101 (2003).

Viola et al., "Robust Real-time Face Detection," International Journal of Computer Vision, vol. 57, pp. 137-154 (2004).

* cited by examiner

IDENTIFYING HIGH SALIENCY REGIONS IN DIGITAL IMAGES

FIELD OF THE INVENTION

This invention pertains to the field of digital image and video processing, and more particularly to a method detecting one or more salient regions in a still or video image.

BACKGROUND OF THE INVENTION

Visual saliency is a very important part of human vision: it is the mechanism that helps in handling the overload of information that is in our visual field by filtering out the redundant information. It can be considered as a measure of the extent that an image area will attract an eye fixation. Unfortunately, little is known about the mechanism that leads to the selection of the most interesting (salient) object in the scene such as a landmark, an obstacle, a prey, a predator, food, mates etc. It is believed that interesting objects on the visual field have specific visual properties that make them different than their surroundings. Therefore, in our definition of visual saliency, no prior knowledge or higher-level information about objects is taken into account. Because it includes a detailed visual processing front-end, saliency detection has wide applicability to computer vision problems, including automated target detection in natural scenes, smart image compression, fast guidance of object recognition systems, and even high-level scene analysis with application to the validation of advertising designs.

Prior art methods for identifying salient objects in a digital image generally require a computationally intensive search process. They also typically require that the salient objects be homogeneous regions.

In the articles "Computational modeling of visual attention" (Nature Reviews, Vol. 2, pp. 194-203, 2001) and "A model of saliency-based visual attention for rapid scene analysis" (IEEE Transactions on Pattern Analysis and Machine Intelligence, Vol. 20, pp. 1254-1259, 1998) Itti et al. teach how to compute low-level computer vision features and then average all responses at different image scales. They compute low-level features of images such as color contrast, edges, and edge orientations at different scales using up and down sampling. They then compute center surround responses at the different scales using differences of Gaussians, and take the local maxima response. Finally, they combine all of the computed responses and generate a saliency map. The saliency map does not provide concrete boundaries around salient regions.

U.S. Pat. No. 6,282,317 to Luo et al., entitled "Method for automatic determination of main subjects in photographic images," discloses a method for automatic determination of main subjects in photographic images. The method provides a measure of belief for the location of main subjects within a digital image, and thereby provides an estimate of the relative importance of different subjects in an image. The output of the algorithm is in the form of a list of segmented regions ranked in a descending order of their estimated importance. The method first segments an input image, and then groups regions into larger segments corresponding to physically coherent objects. A saliency score is then computed for each of the resulting regions, and the region that is mostly to contain the main subject is determined using probabilistic reasoning. However, one of the shortcomings of this approach is that image regions that constitute a main subject are not necessarily coherent with each other. For example if the main subject is a person wearing a red shirt with black pants, region merging will generally not combine the two regions.

U.S. patent application Publication 2008/0304740 to Sun et al., entitled "Salient object detection," discloses a method for detecting a salient object in an input image. With this approach, the salient object is identified using a set of local, regional, and global features including multi-scale contrast, center-surround histogram, and color spatial distribution. These features are optimally combined through conditional random field learning. The learned conditional random field is then used to locate the salient object in the image. Image segmentation can then be used to separate the salient object from the image background.

Hou et al., in an article entitled "Saliency detection: a spectral residual approach" (IEEE Conference on Computer Vision and Pattern Recognition, pp. 1-8, 2007) describe a method to approximate the "innovation" part of an image by removing a statistically redundant component. The method involves performing center-surround (high pass) filtering of log spectral magnitudes. This approach tends to detect small salient regions well, however it does not perform as well for large regions since they generally carry redundant components inside the region boundaries.

Achanta et al., in an article entitled "Frequency-tuned salient region detection" (IEEE Conference on Computer Vision and Pattern Recognition, pp. 1597-1604, 2009), describe a salient region detection method that produces full resolution saliency maps with well-defined boundaries of salient objects. The method involves computing a mean color for the entire image and then subtracting the mean color from each pixel value to produce a saliency map. The method segments the image, determines a saliency response for each mean-shift segmented region and collects segmented regions that exceed an adaptive threshold. This approach is not capable of detecting a local salient region if the mean color of the local salient region is similar to that of entire image.

Donoser et al., in an article entitled "Saliency driven total variation segmentation" (IEEE International Conference on Computer Vision, pp. 817-824, 2009), introduce an unsupervised color segmentation method. The underlying idea involves segmenting the input image several times, each time focusing on a different salient part of the image and to subsequently merge all obtained results into one composite segmentation. The method identifies salient parts of the image by applying affinity propagation clustering to efficiently calculated local color and texture models. Each salient region then serves as an independent initialization for a figure/ground segmentation. Segmentation is done by minimizing a convex energy function based on weighted total variation, leading to a global optimal solution. Each salient region provides an accurate figure/ground segmentation highlighting different parts of the image. These highly redundant results are combined into one composite segmentation by analyzing local segmentation certainty.

Valenti et al., in an article entitled, "Image saliency by isocentric curvedness and color" (IEEE International Conference on Computer Vision, pp. 2185-2192, 2009) propose a novel computational method to infer visual saliency in images. The method is based on the idea that salient objects should have local characteristics that are different than the rest of the scene, the local characteristics being edges, color or shape. By using a novel operator, these characteristics are combined to infer global information. The resulting global information is used as a weighting for the output of a segmentation algorithm so that a salient object in the scene can be distinguished from the background.

There remains a need for a computationally efficient method to determine object saliency in a digital image that can work with both homogeneous and non-homogeneous image regions having a wide range of shapes and sizes.

SUMMARY OF THE INVENTION

The present invention represents a method for identifying high saliency regions in a digital image having an array of image pixels, comprising:

using a data processor to automatically analyze the digital image to segment the digital image into a plurality of segmented regions, each segmented region including a set of image pixel and being bounded by a segment boundary;

determining a saliency value for each segmented region by:

determining a surround region including a set of image pixels surrounding the segmented region, wherein the surround region has an outer boundary and an inner boundary defined by the segment boundary;

using a data processor to automatically analyze the image pixels in the segmented region to determine one or more segmented region attributes;

using a data processor to automatically analyze the image pixels in the surround region to determine one or more corresponding surround region attributes; and determining a region saliency value responsive to differences between the one or more segmented region attributes and the corresponding surround region attributes;

merging neighboring segmented regions that share a common boundary in response to determining that one or more specified merging criteria are satisfied, wherein the specified merging criteria include a criterion that the saliency of the merged segmented region be higher than the saliency of neighboring segmented regions;

designating one or more of the segmented regions having the highest region saliency values to be high saliency regions; and storing an indication of the one or more high saliency regions in a processor-accessible memory.

This invention has the advantage that salient objects composed of several, statistically inhomogeneous regions can be detected as a whole. It has the additional advantage that it can efficiently detect both large and small salient regions.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image", as used herein, refers to any type digital image, such as a digital still image or a digital video image.

Figure 1:
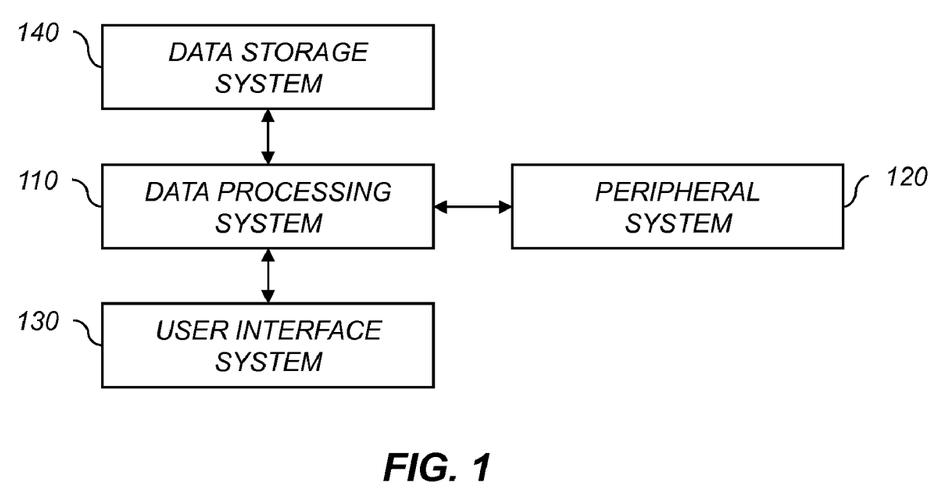
FIG. 1 is a high-level diagram showing the components of a system for determining image saliency according to an embodiment of the present invention.

FIG. 1 is a high-level diagram showing the components of a system for identifying high saliency regions in a digital image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2. A digital image 200 is provided to a resize digital image step 205 where a resize operation is performed to produce a resized digital image 210. In a preferred embodiment the digital image 200 is resized to have width of 64 pixels while the aspect ratio is preserved.

Next, a segment digital image step 215 is performed to segment the resized digital image 210 into a plurality of segmented regions 220 ($c_i$). Any method for segmenting digital images into image regions known in the art can be used in accordance with the present invention. Typically the segment digital image step 215 determines the segmented regions 220 based on the color of the image pixels, grouping together image pixels having a similar color. In a preferred embodiment, the method described by Felzenszwalb et al. in the article entitled, "Efficient graph-based image segmentation" (International Journal of Computer Vision, Vol. 59, pp. 167-181 2004), is used to perform the segment digital image step 215.

In a preferred embodiment, the well-known "disjoint-set forests data structure" described by Cormen et al. in a book entitled, "Introduction to Algorithms" (MIT Press and McGraw-Hill, $2^{nd}$ Edition, Chapter 21, pp. 498-524, 2001) is used to store the information about the set of segmented regions 220. This data structure is useful to provide various bookkeeping functions that are associated with the various operations that are applied to the set of segmented regions 220 (e.g., merging two segmented regions to form a new region). An example of using disjoint-set forests data structures as part of an image segmentation process can be found in the aforementioned article by Felzenszwalb et al. entitled "Efficient graph-based image segmentation". Whereas the method of Felzenszwalb et al. makes decisions about merging neighboring regions based on a measure of region similarity, the present invention merges neighboring regions to produce an increase of center-surround differences for the regions. This idea can be used as a post processing for any method for segmenting digital images into image regions known in the art without loss of generality.

Then the segment digital image step 215 produces a set of M segmented regions 220 ($c_i$), where each segmented region 220 ($c_i$) is comprised of a set of two-dimensional (2-D) image pixels. A construct graph step 235 is used to construct a graph 240 (G=(c,e)). The graph 240 (G) includes a set of nodes (c) corresponding to the segmented regions 220 ($c_i$), together with a set of edges ($e_t(i,j)$) connecting pairs of nodes ($c_i$ and $c_j$). As part of the construct graph step 235, a saliency value ($v_i$) is determined for each segmented region 220 ($c_i$), and each edge ($e_t$) is assigned a corresponding edge weight (w). In a preferred embodiment, the edge weight ($w_t$) for a particular edge ($e_t$) is defined to be the estimated saliency value that would result if the two segmented regions ($c_i$ and $c_j$) that are connected by the particular edge ($e_t$) were to be merged. Additional details of the construct graph step 235 will be described later with reference to FIG. 3.

Next, a sort edges step 245, is used to sort the edges ($e_t$) of the graph 240 (G) in order of ascending edge weight ($w_t$). The sort edges step 245 produces a set of N sorted edges 250. An initialize t step 255, which initializes an edge index t to have a value t=1. A merge regions test 260 is used to determine whether the two segmented regions ($c_i$ and $c_j$) that are connected by the edge ($e_t$) should be merged. The merge regions test 260 decides whether the two segmented regions ($c_i$ and $c_j$) should be merged based on whether the following merging criteria are satisfied:

1) The saliency of the merged region would be higher than the saliency of either of the individual segmented regions. In equation form: $w_t(i,j) > v_j$ and $w_t(i,j) > v_j$, where $v_i$ and $v_j$ are saliency values of the segmented regions $c_i$ and $c_j$, respectively;

2) A region similarity value $S(c_i,c_j)$ determined between the two segmented regions $c_i$ and $c_j$ exceeds a predetermined threshold $S_T$. In equation form: $S(c_i,c_j) > S_T$. (In a preferred embodiment, $S_T=0.6$) Additional details regarding the computation of the saliency values ($v_i$ and $v_j$), the region similarity values $S(c_i,c_j)$, and the edge weights $w_t(i,j)$ will be described shortly.

If the merge regions test 260 indicates that the two segmented regions should not be merged, an increment t step 270 is used to increment the edge index t in order to consider the next edge by setting t=t+1.

If the merge regions test 260 indicates that the two segmented regions should be merged, a merge segmented regions step 265 is used to merge the two segmented regions ($c_i$ and $c_j$). Additional details of the merge segmented regions step 265 will be described later with reference to FIG. 5. Following the merge segmented regions step 265, execution proceeds to the increment t step 270.

Next, a done test 275 is used to determine whether any edges remain to be considered. This is done by comparing the edge index t to the number of edges N. If t≦N, then execution proceeds to the merge regions test 260, where the next edge $e_t$ is considered. If t>N, execution proceeds to a designate high saliency regions step 280.

The designate high saliency regions step 280 designates one or more of the segmented regions to be high saliency regions 285. In a preferred embodiment, an indication of the designated high saliency regions 285 is stored in a processor-accessible memory. The indication of the designated high saliency regions 285 can take a variety of forms. For example, in some embodiments the indication of the designated high saliency regions 285 can be a set of curves specifying region boundaries. Alternately, the indication of the designated high saliency regions 285 can take other forms such as parameters defining bounding boxes enclosing the high saliency regions, coordinates specifying the positions of centroids for the high saliency regions, or index values identifying particular segmented regions in a set of stored segmented regions.

In a preferred embodiment, the designate high saliency regions step 280 designates K=3 segmented regions $c_i$ having the highest saliency values $v_i$. In different embodiments, the designate high saliency regions step 280 can use other criteria to designate the high saliency regions 285. For example, different values of K can be used besides K=3. Alternately, a saliency threshold $v_T$ can be defined, and any segmented regions $c_i$ having a corresponding saliency value $v_i \geq v_T$ can be designated to be high saliency regions 285. In some embodiments, these two criteria can be combined such that the designate high saliency regions step 280 designates the K segmented regions $c_i$ having the highest saliency values $v_i$ to be the high saliency regions 285, subject to the limitation that the segmented regions must have a saliency value $v_i \geq v_T$. With this approach, there would be a maximum of K segmented regions that are designated to be high saliency regions 285.

Figure 7:
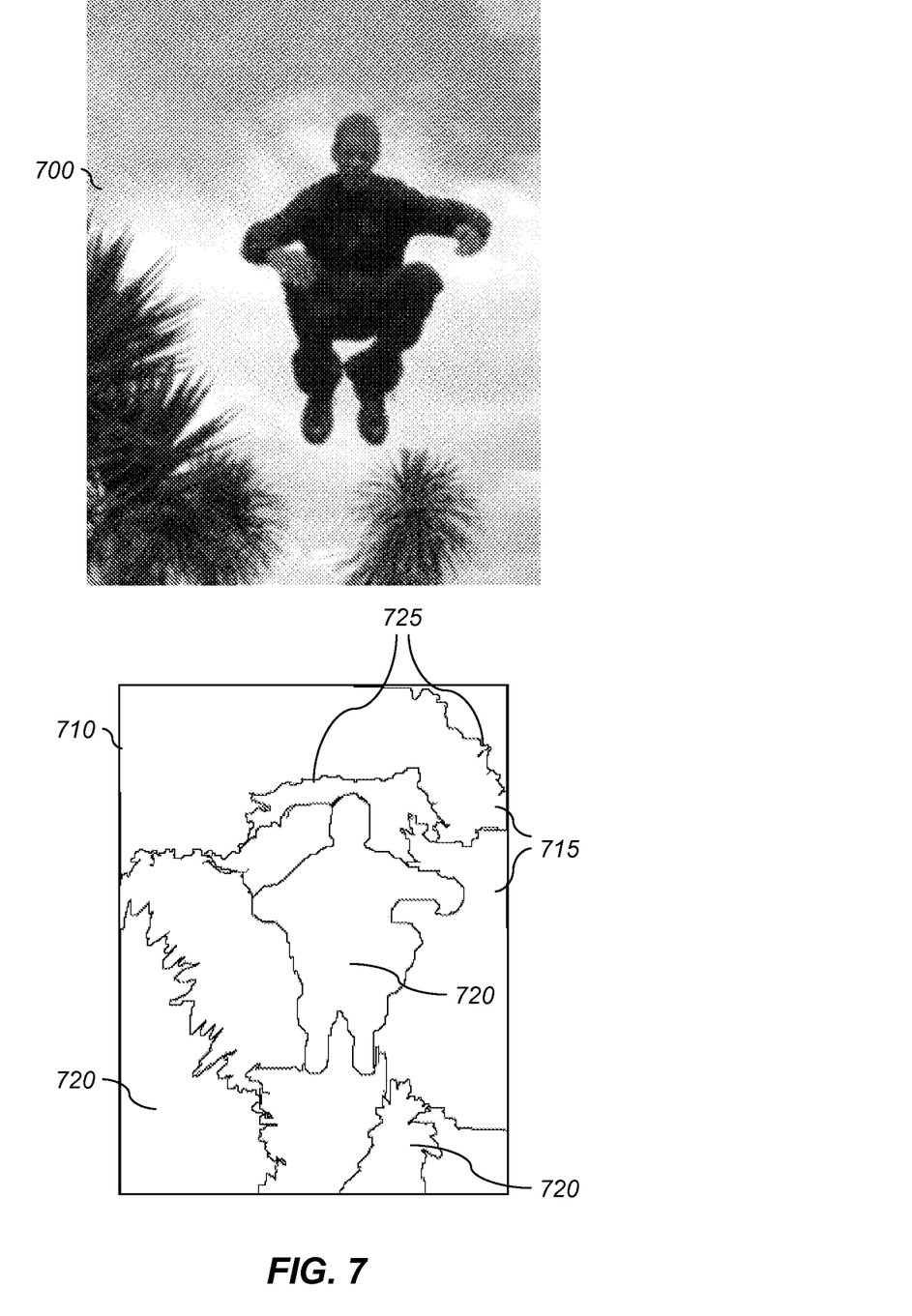
FIG. 7 shows high saliency regions determined for a sample image in accordance with the present invention.

FIG. 7 illustrates a sample digital image 700. Processing the digital image 700 according to the method of FIG. 2 produces a segmented regions map 710 having a plurality of segmented regions 715 bounded by segment boundaries 725. The segmented regions 715 represent the final set of regions after any of the original segmented regions 220 (FIG. 2) determined by the segment digital image step 215 (FIG. 2) have been merged, using the merge segmented regions step 265 (FIG. 2). The three segmented regions 715 having the highest saliency values are designated to be high saliency regions 720.

Figure 3:
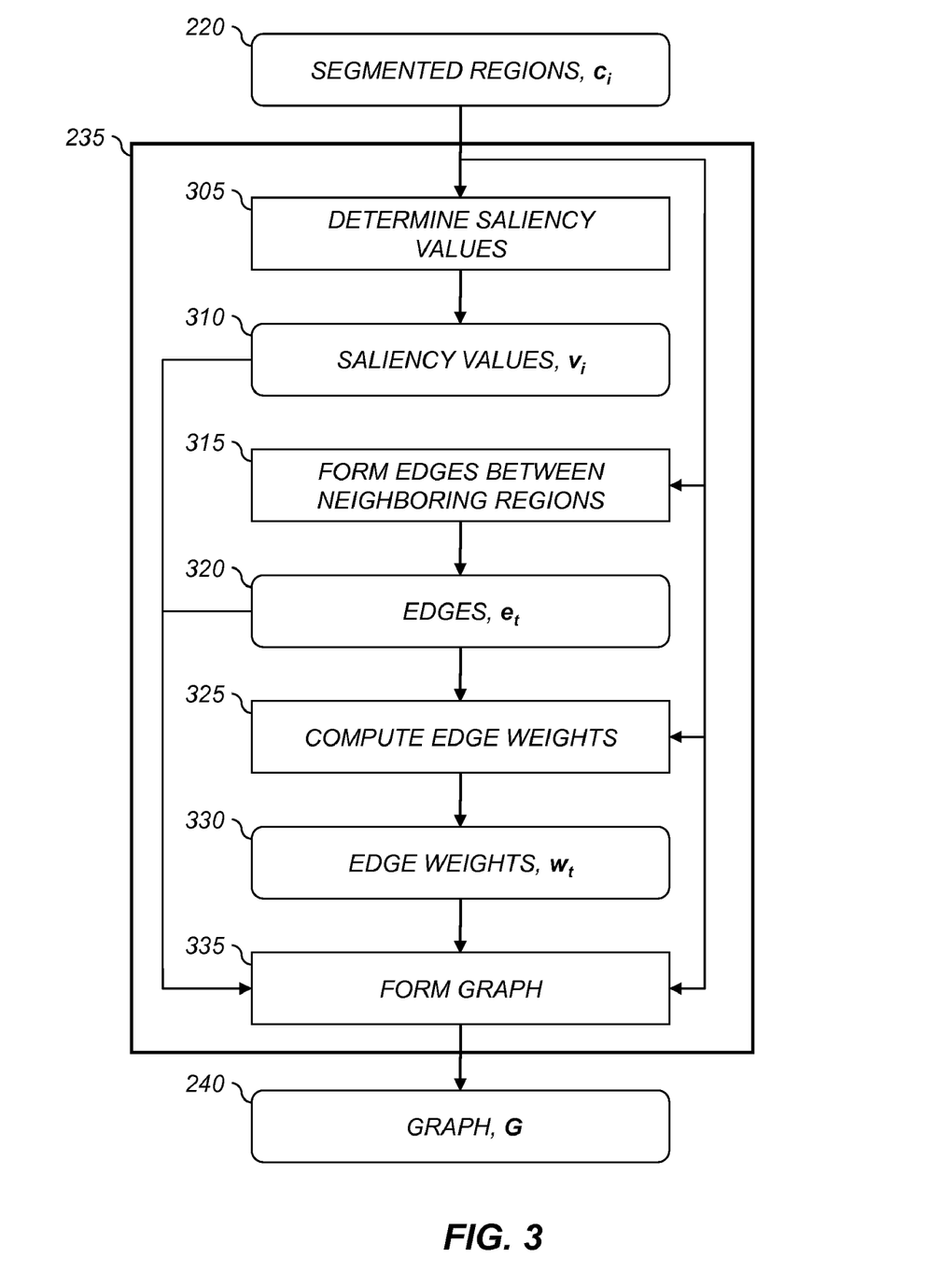
FIG. 3 is a flowchart showing additional details for the construct graph step of FIG. 2.

FIG. 3 shows additional details of the construct graph step 235 according to a preferred embodiment. A determine saliency values step 305 is used to compute saliency values 310 ($v_i$) for each segmented region 220 ($c_i$). Additional details regarding the computation of the saliency values 310 will be described later with reference to FIG. 4.

A form edges between neighboring regions step 315 is used to define a set of edges 320 ($e_t(i,j)$) between neighboring segmented regions 220. An edge 320 ($e_t$) is formed between a particular pair of segmented regions 220 ($c_i$ and $c_j$) if their region boundaries meet each other. In a preferred embodiment, this is determined by applying a morphological dilation operation (⊕) to one of the segmented regions 220 ($c_i$ and $c_j$) using 3×3 square block structuring element ($B_1$). A set intersection operation (∩) is then performed between the dilated region and one of the segmented regions 220 ($c_i$ and $c_j$) to determine an intersection set F. In equation form, this process is given as:

$$F = c_i \cap (c_j \oplus B_1) \text{tm} \quad (1)$$

The form edges between neighboring regions step 315 forms an edge 320 ($e_t$) between the particular pair of segmented regions 220 ($c_i$ and $c_j$) only if the intersection set F is not a null set, indicating that they have boundaries that meet each other.

A compute edge weights step 325 is used to compute edge weights 330 ($w_t$) for each of the edges 320 ($e_t$). The edge weight 330 for an edge 320 $e_t(i,j)$ connecting a pair of segmented regions 220 $c_i$ and $c_j$ is designated by $w_t(i,j)$. In a preferred embodiment, the edge weight 330 $w_t(i,j)$ is defined to be a merged region saliency ($v_m$) computed for the merged region $c_m$ that would result from merging the pair of segmented regions 220 ($c_i$ and $c_j$). Additional details regarding the merging of two segmented regions and the determination of a merged region saliency will be described later with reference to FIG. 5.

Figure 8:
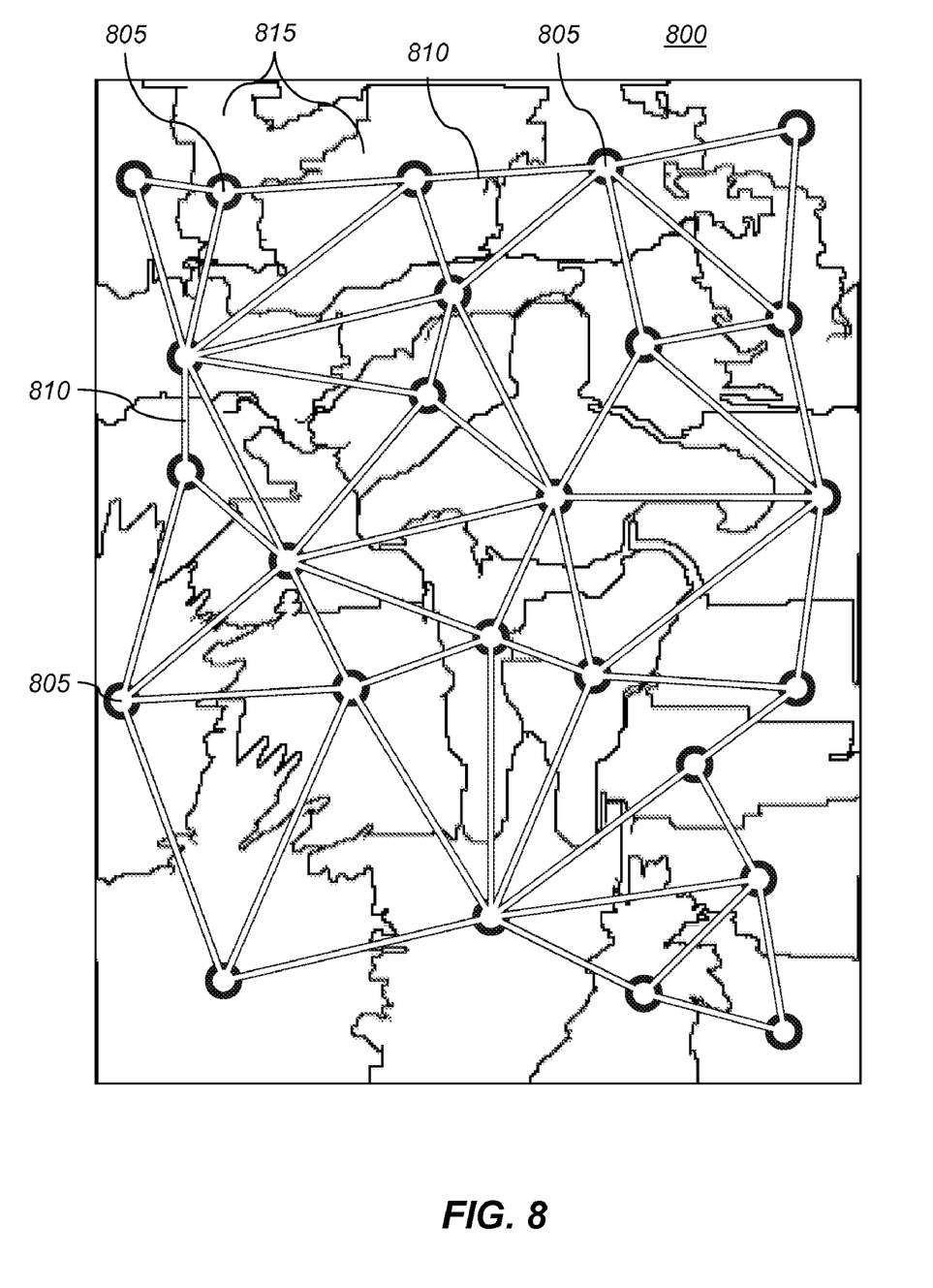
FIG. 8 shows a graph corresponding to the sample image of FIG. 7.

A form graph step 335 is used to build the graph 240 (G=(c,e)) using the segmented regions 220 ($c_i$), the determined saliency values 310 ($v_i$), edges 320 ($e_t$), and edge weights 330 ($w_t$). FIG. 8 shows a sample graph 800 constructed by the aforementioned process based on the sample image 700 of FIG. 7. The graph 800 includes a set of graph nodes 805 representing a set of segmented regions 815. The graph nodes 805 for neighboring segmented regions 815 that share a boundary are connected by graph edges 810.

Figure 4:
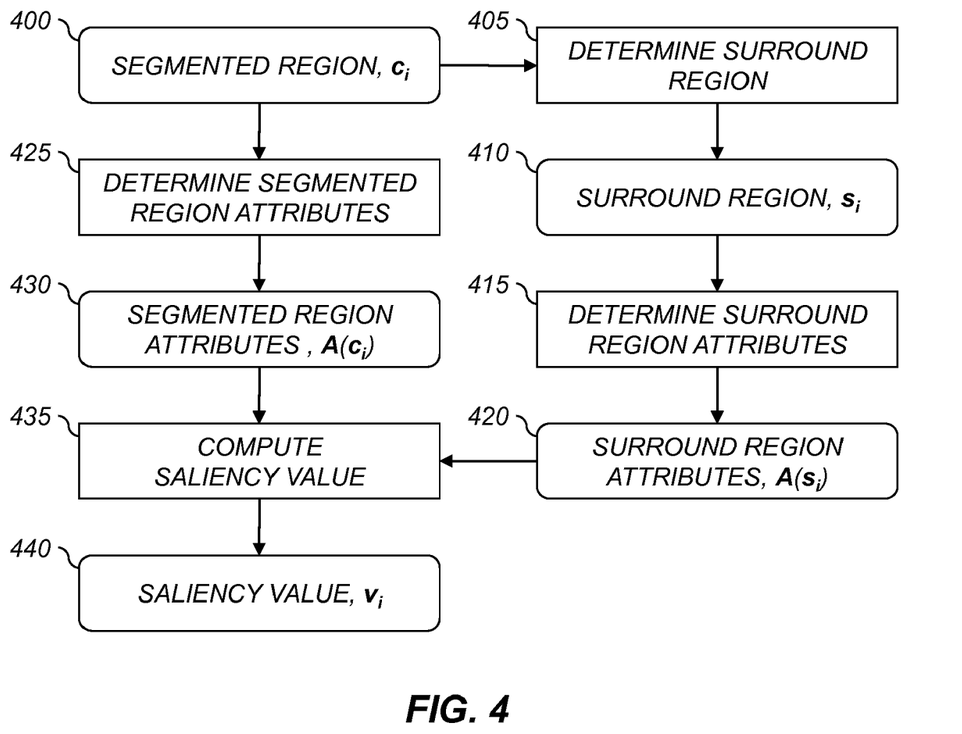
FIG. 4 is a flowchart showing a method for determining a saliency value for a segmented region.

FIG. 4 illustrates a method for computing a saliency value 440 ($v_i$) for a particular segmented region 400 ($c_i$). According to a preferred embodiment, this method is used by the determine saliency values step 305 in FIG. 3 to compute saliency values 310 ($v_i$) for each segmented region 220 ($c_i$).

A determine surround region step 405 determines a surround region 410 that surrounds the segmented region 400. The surround region 410 includes a set of image pixels surrounding the segmented region 400. The surround region 410 has an outer boundary and an inner boundary, wherein the inner boundary corresponds to the boundary of the segmented region 400. Any method known in the art for determining a surround region can be used in accordance with the present invention. In a preferred embodiment, the determine surround region step 405 determines the surround region 410 by applying a morphological dilation operation to the segmented region 400. Formally, the surround region 410 ($s_i$) is calculated by:

$$s_i = (c_i \oplus B_2) \setminus c_i \quad (2)$$

where ⊕ is a morphological dilation operator, $B_2$ is a 10×10 structuring element and \ is a set operator where P\Q is the well-known set relative complement of Q in P, also known as the set-theoretic difference of P and Q (the set of elements in P, but not in Q). It will be obvious to one skilled in the art that other types and sizes of structuring elements can be used in accordance with the present invention. In other embodiments, the surround region 410 ($s_i$) can be calculated by a set complement of $c_i$.

Figure 6A:
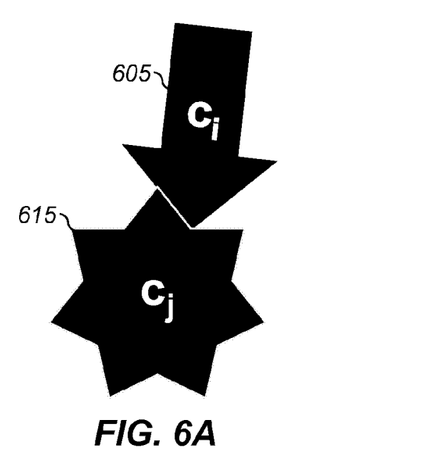
FIG. 6A is a diagram showing example segmented regions.
Figure 6B:
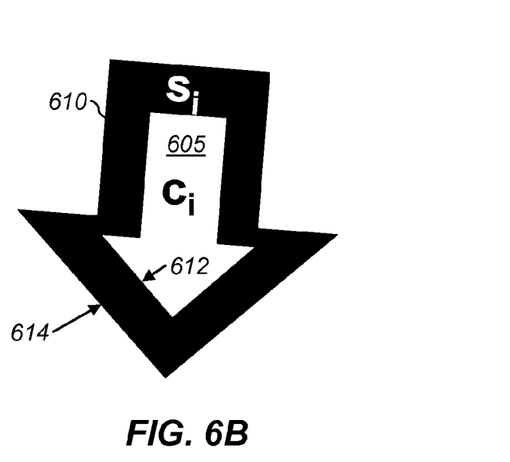
FIGS. 6B and 6C illustrate surround regions corresponding to the example segmented regions of FIG. 6A.

FIG. 6A shows an example of two adjacent segmented regions (first segmented region 605 ($c_i$) and second segmented region 615 ($c_j$)). FIG. 6B shows a first surround region

Figure 6C:
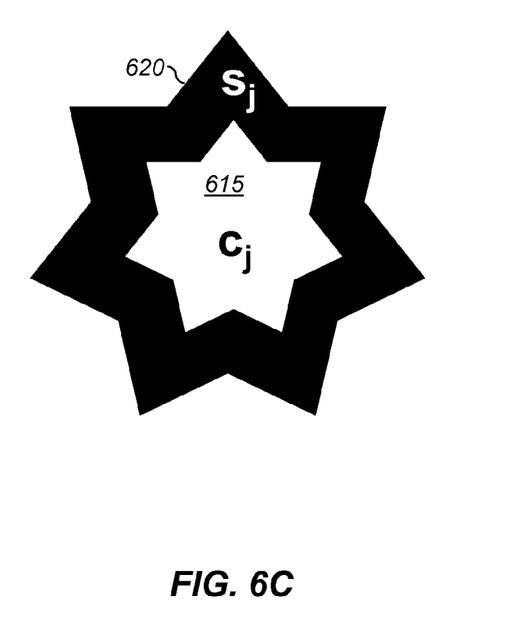

610 ($s_i$) determined for the first segmented region 605 ($c_i$) according to Eq. (2). It can be seen that the surround region 610 has an inner boundary 612 and an outer boundary 614, where the inner boundary 612 of the surround region 610 corresponds to the boundary of the segmented region 605. Similarly, FIG. 6C shows a second surround region 620 ($s_j$) determined for the second segmented region 615 ($c_j$).

Returning to a discussion of FIG. 4, the determined surround region 410 is provided to a determine surround region attributes step 415. The determine surround region attribute step 415 determines a set of surround region attributes 420 ($A(s_i)$). The surround region attributes 420 are provided to a determine saliency values step 435. Similarly, a determine segmented region attributes step 425 determines a set of segmented region attributes 430 ($A(c_i)$).

The determine surround region attribute step 415 and the determine segmented region attributes step 425 determine sets of region attributes ($A(s_i)$ and $A(c_i)$) characterizing various attributes of the respective regions. Any set of region attributes known in the art can be used for this purpose. In a preferred embodiment, the region attributes include a color histogram attribute and an edge response attribute. Examples of other region attributes that can be used in accordance with the present invention include average color attributes, color contrast attributes, isocentric curvedness attributes, semantic content attributes and image texture attributes.

The color histogram attribute can be determined in various ways. In a preferred embodiment, the color histogram attribute is a Hue-Saturation-Value (HSV) histogram, where Hue, Saturation and Value are color dimensions of the well-known HSV color space. However, it will be obvious to one skilled in the art that color histogram attributes can also be calculated using any other type of color space. The HSV histogram of a region r is denoted by $A_h(r)$, where r is either a segmented region 400 ($c_i$) or a surround region 410 ($s_i$). In a preferred embodiment, the HSV histogram $A_h(r)$ uses 10 bins each for the hue (H), saturation (S), and value (V) color dimensions.

The edge response attribute can be determined in various ways. In a preferred embodiment, the edge response attribute of the region r is denoted by $A_e(r)$, and is computed by using the well-known histogram of oriented gradients method. This method involves computing a set of gradients and performing a weighted voting process to form an orientation-based histogram, where the weights are a function of the magnitude of the gradients. A description of this procedure can be found in the article by Dalal et al., entitled "Histograms of oriented gradients for human detection" (IEEE Conference on Computer Vision and Pattern Recognition, pp. 886-893, 2005).

An example of an average color attribute would simply be a measure of the average color in the image region. The measure of the average could be use various statistical measures such as mean, median or mode, and could be calculated in various color spaces such as the well-known HSV, RGB, YCRCB or CIELAB color spaces.

An example of a color contrast attribute would be a measure of color variability in the image region. The measure of color variability could use various statistical measures such as range, standard deviation, variance and color histogram extent. The color variability can be characterized for one or more color channels of an appropriate color space, such as those listed above.

An example of an isocentric curvedness attribute can be found in the aforementioned article by Valenti et al., entitled, "Image saliency by isocentric curvedness and color."

An example of a semantic content attribute would be a difference in the detected number of a certain type of object (e.g. face). Such objects can be detected using the method described by Viola et al., in the article entitled, "Robust Real-time Face Detection" (International Journal of Computer Vision, Vol. 57, pp. 137-154, 2004), or using the method described by Dalal et al., in the aforementioned article entitled "Histograms of oriented gradients for human detection."

Examples of image texture attributes can be found in the article by Albuz et al. entitled "Scalable Color image indexing and retrieval using vector wavelets" (IEEE Transactions on Knowledge and Data Engineering, Vol. 13, pp. 851-861, 2001), and in the article by Qiu, entitled, "Color Image Indexing using BTC" (IEEE Transaction on Image Processing, Vol. 12, pp. 93-101, 2003).

The surround region attributes 420 ($A(s_i)$) and the segmented region attributes 430 ($A(c_i)$) are provided to a compute saliency value step 435, which determines the saliency value 440 ($v_i$). In a preferred embodiment, the saliency value 440 is determined responsive to differences between the surround region attributes 420 and the segmented region attributes 430. Generally, the saliency value 440 can be determined by computing attribute difference values between the surround region attributes 420 and the corresponding segmented region attributes 430, and then combining the attribute difference values to determine the saliency value 440.

Any method known in the art for determining differences between sets of attributes can be used in accordance with the present invention. In a preferred embodiment, a difference between the color histogram attributes $A_h(c_i)$ and $A_h(s_i)$ can be characterized by the well-known normalized cross correlation value, denoted by $NCC[A_h(c_i),A_h(s_i)]$. The determined normalized cross correlation values will range from −1 to 1, where high cross correlation values will correspond to cases where the color histogram attributes are very similar. In the same manner, similarity between the edge response attributes $A_e(c_i)$ and $A_e(s_i)$ can be also measured using a normalized cross correlation: $NCC[A_e(c_i),A_e(s_i)]$. Other methods for determining differences between sets of attributes would include computing a Euclidean distance between the attribute values. In a preferred embodiment of invention, the saliency value 440 ($v_i$) for the $i^{th}$ segmented region ($c_i$) is computed from the normalized cross correlations of region attributes using the following relationship:

$$v_i = 0.5 \times \max[1-NCC[A_e(c_i),A_e(s_i)], 1-NCC[A_h(c_i),A_h(s_i)]] \quad (3)$$

where max[A,B] is an operator that returns the maximum value of A and B, and NCC[A,B] is the normalized cross correlation operator between A and B. In this case, the quantity $1-NCC[A_e(c_i),A_e(s_i)]$ corresponds to an edge attribute difference value, and the quantity $1-NCC[A_h(c_i),A_h(s_i)]$ corresponds to a color histogram attributes difference value.

When the differences between the region attributes for the segmented region ($c_i$) and the surround region ($s_i$) are large, the resulting saliency value 440 ($v_i$) will be large. Conversely, when the differences between the region attributes for the segmented region ($c_i$) and the surround region ($s_i$) are small, the resulting saliency value 440 ($v_i$) will be small. Thus, it can be seen that high saliency regions are those regions that have attributes that are significantly different than the attributes of the surrounding image regions.

The saliency value 440 ($v_i$) computed using Eq. (3) is based on determining a maximum of the attribute difference values. Therefore, if either the edge attribute difference value or the color histogram difference value is large, the saliency value 440 will be large. In other embodiments, the attribute difference values using other approaches. For example, the attribute difference values can be combined by averaging them together. In some embodiments, the averaging process can be a weighted averaging process so that different weights can be assigned to the different attributes. In some cases, the different attribute difference values may have significantly different ranges. Accordingly, it will sometimes be desirable to scale the attribute difference values to a predefined range before combining them to determine the saliency value 440.

As discussed earlier, the merge regions test 260 of FIG. 2 includes determining a measure of similarity between two segmented regions $c_i$ and $c_j$. In a preferred embodiment, the similarity $S(c_i,c_j)$ is also calculated from the normalized cross correlations of region attributes using the following relationship:

$$S(c_i,c_j)=\max[\text{NCC}[A_e(c_i), A_e(c_j)], \text{NCC}[A_h(c_i), A_h(c_j)]] \tag{4}$$

Additional details of the merge segmented regions step 265 (FIG. 2) will now be described with reference to FIG. 5. As mentioned earlier, this basic process is also used for the compute edge weights step 325 (FIG. 3). Inputs are a pair of neighboring segmented regions 500 and 501 ($c_i$ and $c_j$). A merge regions step 505 is used to merge the segmented regions 500 and 501 to form a merged region 510. The merged region 510 ($c_m$) is computed by:

$$c_m = c_i \cup c_j \tag{5}$$

where $\cup$ is the set union operator.

The merged region 510 is provided to a determine merged surround region step 515. The determine merged surround region step 515 determines a merged surround region 520 ($s_m$) corresponding to the merged region 510 ($c_m$). In one embodiment, the determine merged surround region step 515 can use the method given earlier in Eq. (2) to determine the merged surround region 520. In a preferred embodiment, the merged surround region 520 ($s_m$) is efficiently determined using the equation:

$$s_m = (s_i + s_j) \backslash c_m \tag{6}$$

In still other embodiments, the merged surround region 520 ($s_m$) is a set complement of $c_m$.

Figure 6D:
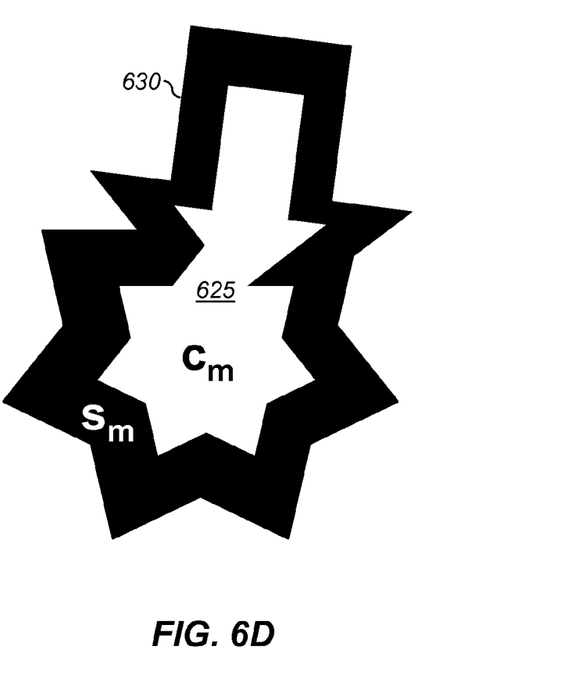
FIG. 6D shows a merged region and a merged surround region corresponding to the example segmented regions of FIG. 6A.

FIG. 6D shows an example of a merged region 625 ($c_m$), formed by merging the segmented region 605 ($c_i$) and the segmented region 615 ($c_j$) of FIG. 6A. A merged surround region 630 ($s_m$) is also shown, which corresponds to the merged region 625 ($c_m$).

Figure 5:
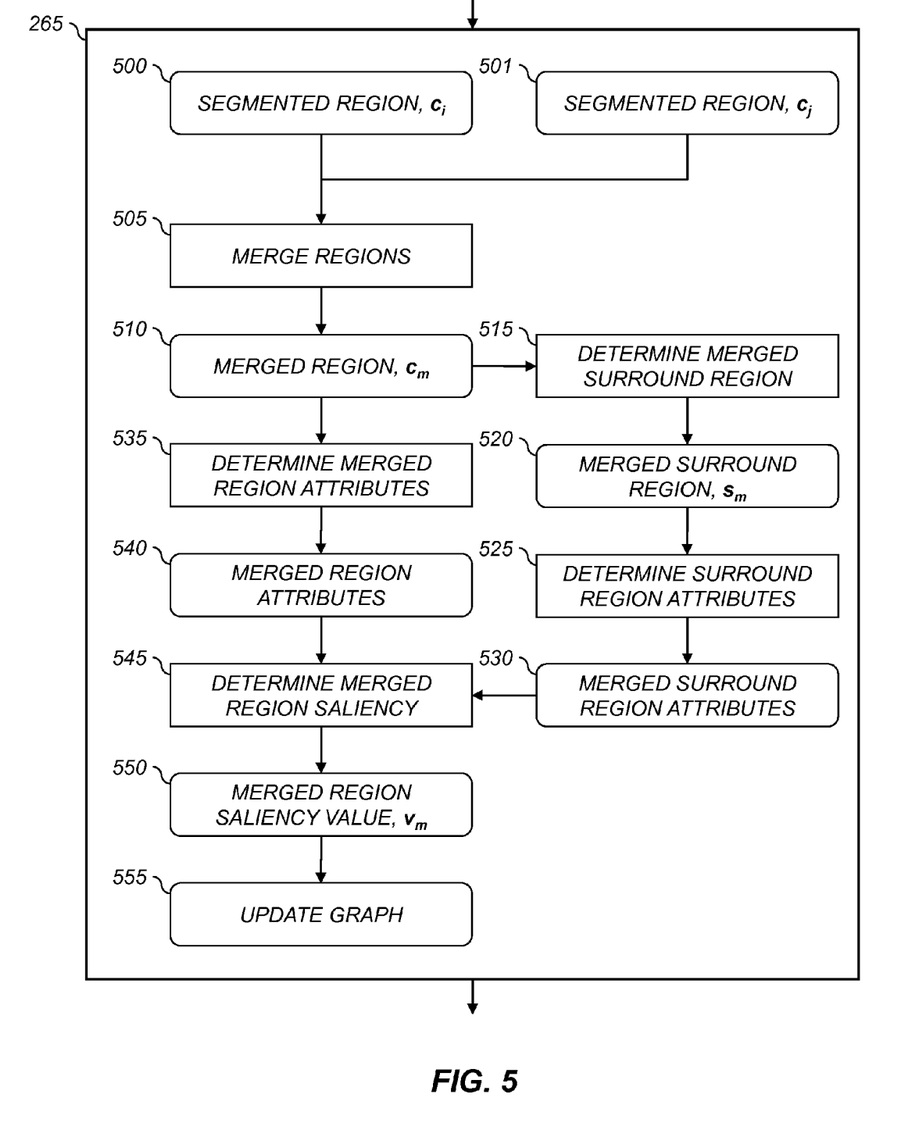
FIG. 5 is a flowchart showing additional details for the merge segmented regions step of FIG. 2.

Returning to a discussion of FIG. 5, a determine merged region attributes step 535 is used to determine merged region attributes 540. In some embodiments, the determine merged region attributes step 535 can perform the same computations that were used for the determine segmented region attributes step 425 (FIG. 4). As discussed earlier, the region attributes $A(r)$ preferably include color histogram attributes $A_h(r)$ and edge response attributes $A_e(r)$. In a preferred embodiment, corresponding merged region attributes 540 can be computed efficiently according to the following equations:

$$A_h(c_m) = A_h(c_i) + A_h(c_j) \tag{7}$$

$$A_e(c_m) = A_e(c_i) + A_e(c_j) \tag{8}$$

The merged surround region 520 ($s_m$) is provided to a determine surround region attributes step 525. In a preferred embodiment, the determine surround region attributes step 525 performs the same computations that were used for the determine surround region attributes step 415 (FIG. 4).

The merged surround region attributes 530 and the merged region attributes 540 are provided to a determine merged region saliency step 545, which determines a merged region saliency value 550. In a preferred embodiment, the merged region saliency value 550 ($v_m$) is determined as:

$$v_m = 0.5 \times \max[1-\text{NCC}[A_e(c_m),A_e(s_m)], 1-\text{NCC}[A_h(c_m), A_h(s_m)]] \tag{9}$$

which is analogous to Eq. (3) above. As mentioned earlier, in a preferred embodiment, the merged region saliency value 550 for a pair of neighboring segmented regions 220 (FIG. 3) $c_i$ and $c_j$ is used as the edge weight 330 ($w_t(i,j)=v_m$) for the corresponding edge 320 ($e_t(i,j)$).

Figure 2:
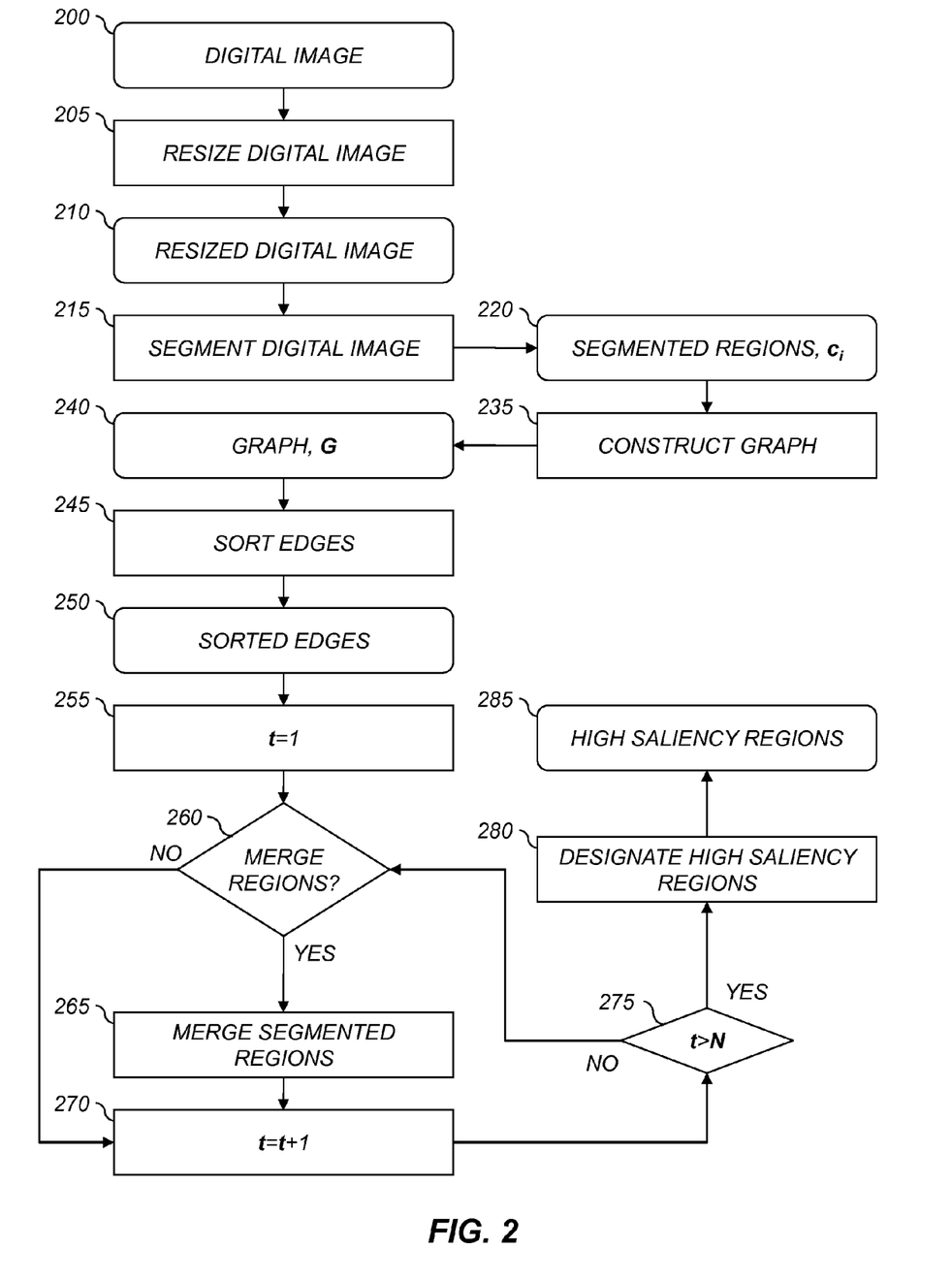
FIG. 2 is a flowchart showing a method for identifying high saliency regions in a digital image in accordance with the present invention.

Returning to a discussion of FIG. 5, an update graph step 555 is used to update the graph 240 (G) of FIG. 2 to reflect the merger of the segmented regions 500 and 501 ($c_i$ and $c_j$). This includes removing the edge $e_t(i,j)$, updating the segmented regions such that $c_i = c_j = c_m$, updating the corresponding saliency values such that $v_i = v_j = v_m$, and computing new edge weights $w_t$ for any edges $e_t$ that are connected to the merged image region $c_m$.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 digital image
205 resize digital image step
210 resized digital image
215 segment digital image step
220 segmented regions
235 construct graph step
240 graph
245 sort edges step
250 sorted edges
255 initialize t step
260 merge regions test
265 merge segmented regions step
270 increment t step
275 done test
280 designate high saliency regions step
285 high saliency regions
305 determine saliency values step
310 saliency values
315 form edges between neighboring regions step
320 edges
325 compute edge weights
330 edge weights
335 form graph step
400 segmented region
405 determine surround region step
410 surround region 415 determine surround region attributes step
420 surround region attributes
425 determine segmented region attributes step
430 segmented region attributes
435 compute saliency value step
440 saliency value
500 segmented region
501 segmented region
505 merge regions step
510 merged region
515 determine merged surround region step
520 merged surround region
525 determine surround region attributes step
530 merged surround region attributes
535 determine merged region attributes step
540 merged region attributes
545 determine merged region saliency step
550 merged region saliency value
555 update graph step
605 segmented region
610 surround region
615 segmented region
612 inner boundary
614 outer boundary
620 surround region
625 merged region
630 merged surround region
700 sample image
710 segmented regions map
715 segmented regions
720 high saliency regions
725 segment boundaries
800 graph
805 graph node
810 graph edge
815 segmented region

The invention claimed is:

1. A method for identifying high saliency regions in a digital image having an array of image pixels, comprising:
using a data processor to automatically analyze the digital image to segment the digital image into a plurality of segmented regions, each segmented region including a set of image pixels and being bounded by a segment boundary;
determining a saliency value for each segmented region by:
determining a surround region including a set of image pixels surrounding the segmented region, wherein the surround region has an outer boundary and an inner boundary defined by the segment boundary;
using a data processor to automatically analyze the image pixels in the segmented region to determine one or more segmented region attributes;
using a data processor to automatically analyze the image pixels in the surround region to determine one or more corresponding surround region attributes; and
determining a region saliency value responsive to differences between the one or more segmented region attributes and the corresponding surround region attributes;
merging neighboring segmented regions that share a common boundary in response to determining that one or more specified merging criteria are satisfied, wherein the specified merging criteria include a criterion that the saliency of the merged segmented region be higher than the saliency of neighboring segmented regions;
designating one or more of the segmented regions having the highest region saliency values to be high saliency regions; and
storing an indication of the one or more high saliency regions in a processor-accessible memory.

2. The method of claim 1 wherein the determination of the region saliency value includes:
determining attribute difference values between each of the one or more segmented region attributes and the corresponding surround region attributes; and
combining the attribute difference values to determine the region saliency.

3. The method of claim 2 wherein the region saliency is determined by averaging the attribute difference values.

4. The method of claim 2 wherein the region saliency is determined by computing the maximum of the attribute difference values.

5. The method of claim 2 wherein the attribute difference values are scaled to a predefined range before they are combined to determine the region saliency.

6. The method of claim 1 wherein one of the segmented region attributes is a color histogram attribute, an average color attribute, a color contrast attribute, an edge response attribute, an isocentric curvedness attribute, an image texture attribute or a semantic content attribute.

7. The method of claim 1 wherein the segmented regions are determined based on a color of the image pixels.

8. The method of claim 1 wherein the determination of the surround region includes:
applying a morphological dilation operator to the segmented region to form a dilated region; and
designating the image pixels that are included in the dilated region but are not included in the segmented region to be the surround region.

9. The method of claim 8 wherein the morphological dilation operator uses a square structuring element having a predefined size.

10. The method of claim 1 wherein the surround region is determined by applying a set complement operator to the segmented region.

11. The method of claim 1 wherein the specified merging criteria include a criterion that a region similarity value determined to represent a similarity the two neighboring segmented regions exceeds a predefined threshold.

12. The method of claim 11 wherein the region similarity value is determined responsive to differences between the one or more segmented region attributes for the two neighboring segmented regions.

13. The method of claim 1 wherein the digital image is down-sampled to a lower resolution before segmenting the digital image into the plurality of segmented regions.

14. A system comprising:
a data processing system; and
a memory system communicatively connected to the data processing system and storing instructions configured to cause the data processing system to implement a method for identifying high saliency regions in a digital image having an array of image pixels wherein the method includes:
analyzing the digital image to segment the digital image into a plurality of segmented regions, each segmented region including a set of image pixels and being bounded by a segment boundary;
determining a saliency value for each segmented region by:
determining a surround region including a set of image pixels surrounding the segmented region, wherein the surround region has an outer boundary and an inner boundary defined by the segment boundary;

analyzing the image pixels in the segmented region to determine one or more segmented region attributes;

analyzing the image pixels in the surround region to determine one or more corresponding surround region attributes; and determining a region saliency value responsive to differences between the one or more segmented region attributes and the corresponding surround region attributes;

merging neighboring segmented regions that share a common boundary in response to determining that one or more specified merging criteria are satisfied, wherein the specified merging criteria include a criterion that the saliency of the merged segmented region be higher than the saliency of neighboring segmented regions;

designating one or more of the segmented regions having the highest region saliency values to be high saliency regions; and storing an indication of the one or more high saliency regions in a processor-accessible memory.

* * * * *